(12) United States Patent
Modin et al.

(10) Patent No.: US 12,275,201 B2
(45) Date of Patent: Apr. 15, 2025

(54) METHODS AND APPARATUSES FOR FORMING COMPOSITE PARTS FROM MULTI-PLY PREPREG COMPOSITE CHARGES

(71) Applicant: The Boeing Company, Chicago, IL (US)

(72) Inventors: Andrew E. Modin, Charleston, SC (US); Dorekia Martin, Ladson, SC (US); Richard E. Heath, Mt. Pleasant, SC (US); Eric C. Anderson, St. Charles, MO (US); Caleb J. Handolescu, Ladson, SC (US); Richard Alexander Prause, Charleston, SC (US); Michael C. Hargrove, Goose Creek, SC (US); Justin H. Register, Charleston, SC (US)

(73) Assignee: The Boeing Company, Arlington, VA (US)

( * ) Notice: Subject to any disclaimer, the term of this patent is extended or adjusted under 35 U.S.C. 154(b) by 559 days.

(21) Appl. No.: 17/384,440

(22) Filed: Jul. 23, 2021

(65) Prior Publication Data

US 2022/0118720 A1     Apr. 21, 2022

Related U.S. Application Data

(60) Provisional application No. 63/089,453, filed on Oct. 8, 2020.

(51) Int. Cl.
*B29C 70/44*     (2006.01)
*B29C 70/54*     (2006.01)
*B29L 31/30*     (2006.01)

(52) U.S. Cl.
CPC .............. *B29C 70/44* (2013.01); *B29C 70/54* (2013.01); *B29L 2031/3076* (2013.01)

(58) Field of Classification Search
None
See application file for complete search history.

(56) References Cited

U.S. PATENT DOCUMENTS 5,328,540 A * 7/1994 Clayton .................. B29C 70/44
                                                            156/286
5,427,518 A * 6/1995 Morizot .................. B29C 70/38
                                                            100/211

(Continued)

FOREIGN PATENT DOCUMENTS

EP     2206598 A1     7/2010
EP     3680092 A4     6/2021

(Continued)

OTHER PUBLICATIONS

European Application Serial No. 21196967.0, Search Report dated Mar. 2, 2022, 8 pages.

(Continued)

*Primary Examiner* — Christopher T Schatz
(74) *Attorney, Agent, or Firm* — Walters & Wasylyna LLC

(57) ABSTRACT

A method of forming a composite part from a mufti-ply prepreg composite charge comprises reducing pressure inside a bladder, located in a chamber that is at atmospheric pressure, below the atmospheric pressure. The method also comprises placing the multi-ply prepreg composite charge, having a first shape, in the chamber and reducing pressure inside the chamber below the atmospheric pressure. The method additionally comprises, while maintaining pressure inside the chamber below the atmospheric pressure, expanding the bladder within the chamber by increasing pressure inside the bladder to the atmospheric pressure, so that the multi-ply prepreg composite charge is compressed between the bladder and a forming tool, which is located inside the chamber, and the multi-ply prepreg composite charge is (Continued)

configured by the forming tool to a second shape, different from the first shape. The method also comprises curing the multi-ply prepreg composite charge, having the second shape.

20 Claims, 13 Drawing Sheets

(56) References Cited

U.S. PATENT DOCUMENTS

| | | | |
|---|---|---|---|
| 5,648,109 | A | 7/1997 | Gutowski et al. |
| 5,772,950 | A | 6/1998 | Brustad et al. |
| 5,795,536 | A | 8/1998 | Gaworowski et al. |
| 6,017,484 | A * | 1/2000 | Hale ............... B29C 70/342 |
| | | | 156/286 |
| 6,991,449 | B1 * | 1/2006 | Mead ............... B29C 43/56 |
| | | | 425/389 |
| 2012/0125534 | A1 * | 5/2012 | Watson ............ B29C 66/1122 |
| | | | 156/583.1 |

FOREIGN PATENT DOCUMENTS

| | | |
|---|---|---|
| JP | H05309676 A | 11/1993 |
| JP | 2007253441 A | 10/2007 |

OTHER PUBLICATIONS

European Application Serial No. 21196967.0, Examination Report dated Sep. 5, 2024, 4 pages.

* cited by examiner

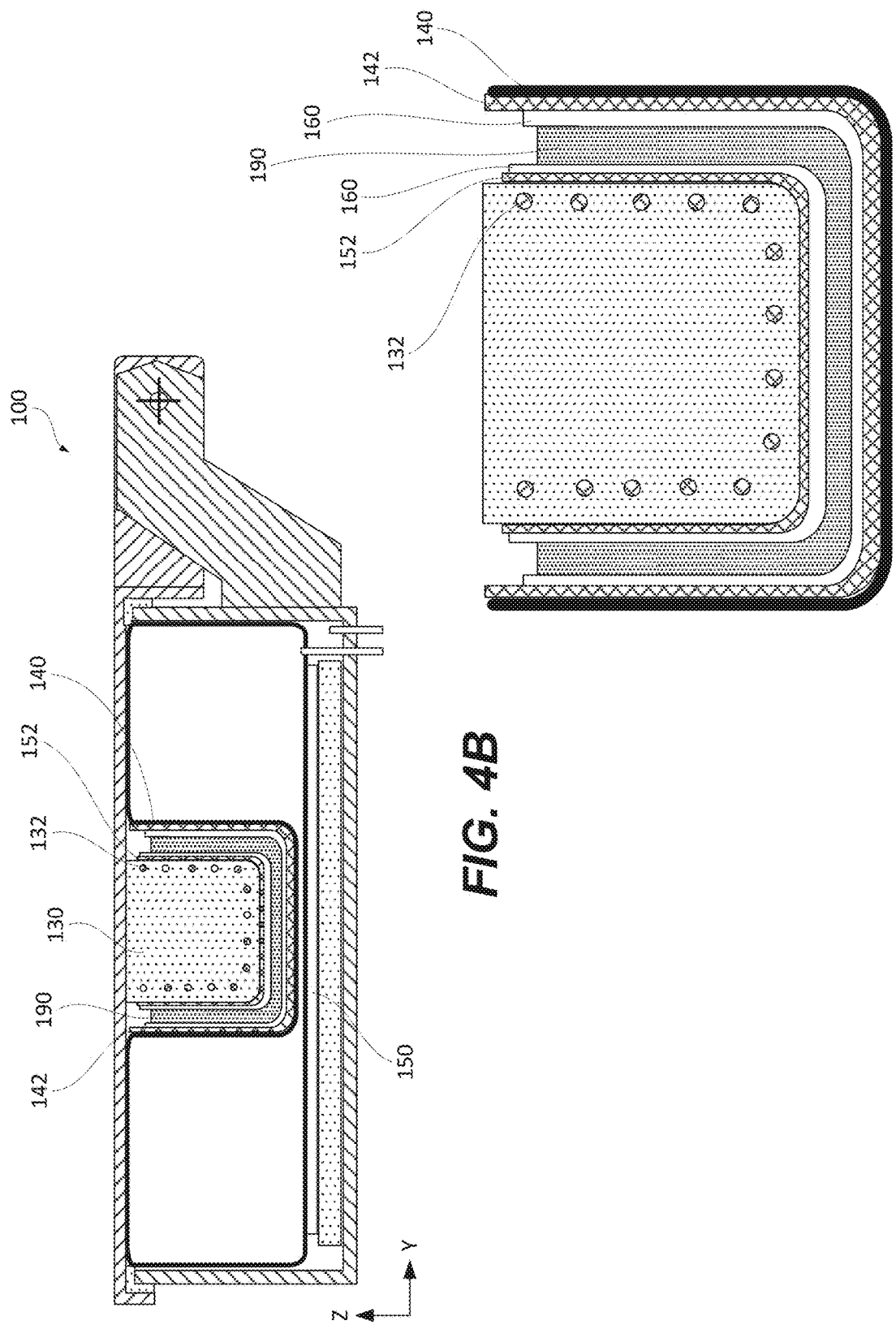

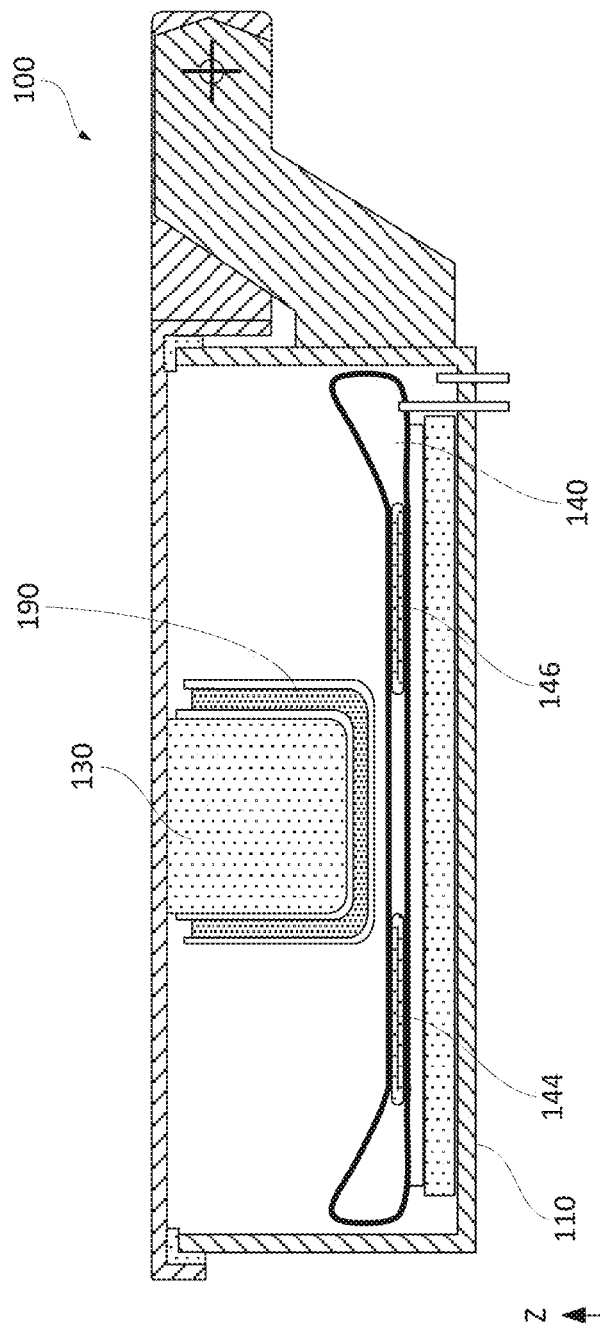

METHODS AND APPARATUSES FOR FORMING COMPOSITE PARTS FROM MULTI-PLY PREPREG COMPOSITE CHARGES

CROSS-REFERENCE TO RELATED APPLICATIONS

This application claims the benefit under 35 U.S.C. § 119(e) of U.S. Provisional Patent Application 63/089,453, filed on Oct, 8, 2020, which is incorporated herein by reference in its entirety for all purposes.

BACKGROUND

Composite materials are becoming more popular for manufacturing aircraft components and other lightweight structures. Composites have excellent strength and stiffness characteristics and are light in comparison, for example, to metals. However, composite structures are still quite expensive to manufacture, e.g., in comparison to metal structures. The manufacturing costs are particularly significant for large composite structures and composite structures with complex geometries. The primary contributors to these high manufacturing costs are equipment complexity and processing time. For example, processing of composite materials often involves degassing, which is the extraction of moisture, volatiles, and/or gases, trapped in these materials. Degassing typically increases manufacturing cycle time and requires the use of specialized equipment, such as an autoclave.

SUMMARY

Accordingly, apparatuses and methods, intended to address at least the above-identified concerns, would find utility.

The following is a non-exhaustive list of examples of the subject matter, disclosed herein.

Disclosed herein is a method of forming a composite part from a multi-ply prepreg composite charge. The method comprises reducing pressure inside a bladder, located in a chamber that is at atmospheric pressure, below the atmospheric pressure. The method also comprises placing the multi-ply prepreg composite charge, having a first shape, in the chamber and reducing pressure inside the chamber below the atmospheric pressure. While maintaining pressure inside the chamber below the atmospheric pressure, the method comprises expanding the bladder within the chamber by increasing pressure inside the bladder to the atmospheric pressure, so that the multi-ply prepreg composite charge is compressed between the bladder and a forming tool, which is located inside the chamber, and the multi-ply prepreg composite charge is configured by the forming tool to a second shape, different from the first shape. The method further comprises curing the multi-ply prepreg composite charge, having the second shape.

The operating sequence, presented above, enables degassing the multi-ply prepreg composite charge prior to forming the multi-ply prepreg composite charge. Specifically, the degassing is performed while at least a part of the multi-ply prepreg composite charge is exposed. At this stage, the multi-ply prepreg composite charge is not yet compressed between the bladder and the forming tool. Once the multi-ply prepreg composite charge is compressed between the bladder and the forming tool, the degassing efficiency decreases as the gas path becomes blocked by the bladder and the forming tool. It should be noted that the degassing continues even while the multi-ply prepreg composite charge is compressed between the bladder and the forming tool, at which point the gassing is less efficient. The more efficient degassing starts and proceeds (e.g., for a period of time) before the multi-ply prepreg composite charge is compressed between the bladder and the forming tool. Furthermore, this degassing is performed without the need for additional equipment. Both the bladder and the chamber are equipped with independent vacuum lines, which enable the pressures inside bladder and inside the chamber to be reduced independently.

BRIEF DESCRIPTION OF THE DRAWINGS

Reference will now be made to the accompanying drawings, which are not necessarily drawn to scale, and where like reference characters designate the same or similar parts throughout the several views. In the drawings:

FIGS. 1A and 1B, according to one or more examples of the subject matter, disclosed herein;

FIGS. 4A and 4B are two schematic, cross-sectional views of a chamber illustrating a step of expanding a bladder within the chamber in accordance with the method FIGS. 1A and 1B, according to one or more examples of the subject matter, disclosed herein;

FIG. 4C is a schematic, expanded, cross-sectional view of the chamber of FIG. 4B, illustrating different heater examples, according to one or more examples of the subject matter, disclosed herein;

FIG. 4F is a schematic, cross-sectional view of a chamber illustrating a step of curing a multi-ply prepreg composite charge in accordance with the method FIGS. 1A and 1B, according to one or more examples of the subject matter, disclosed herein;

DETAILED DESCRIPTION

Figure 5:
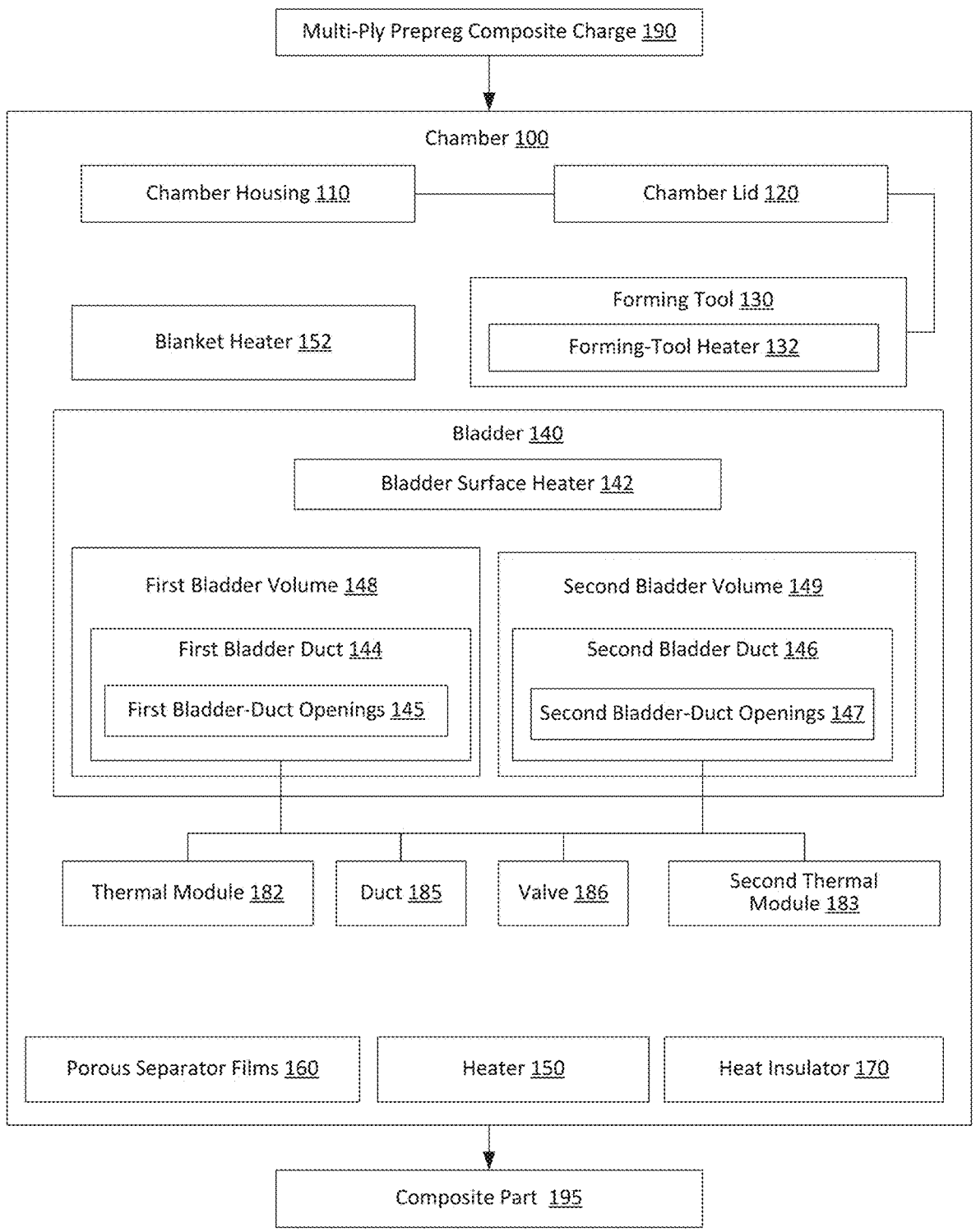
FIG. 5 is a block diagram of an apparatus for forming a composite part from a multi-ply prepreg composite charge, according to one or more examples of the subject matter, disclosed herein.

In FIG. 5, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist, Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 5 may be combined in various ways without the need to include other features described in FIG. 5, other drawing figures, and/or the accompanying disclosure, even though such combination or combinations are not explicitly illustrated herein. Similarly, additional features not limited to the examples presented, may be combined with some or all of the features shown and described herein.

Figure 1A:
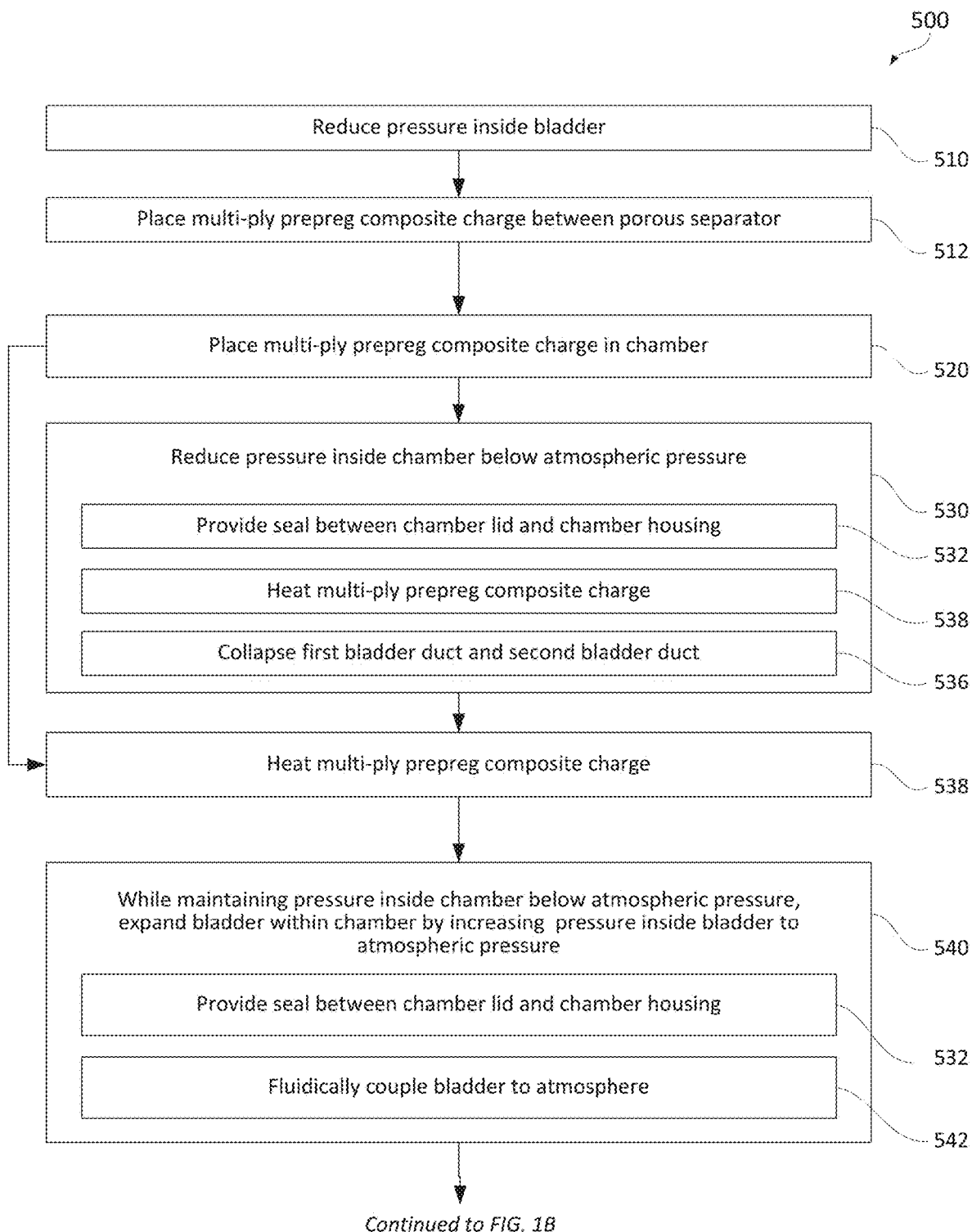
FIGS. 1A and 1B, collectively, are a block diagram of a method, according to one or more examples of the subject matter, disclosed herein, of forming a composite part from a multi-ply prepreg composite charge.
Figure 1B:
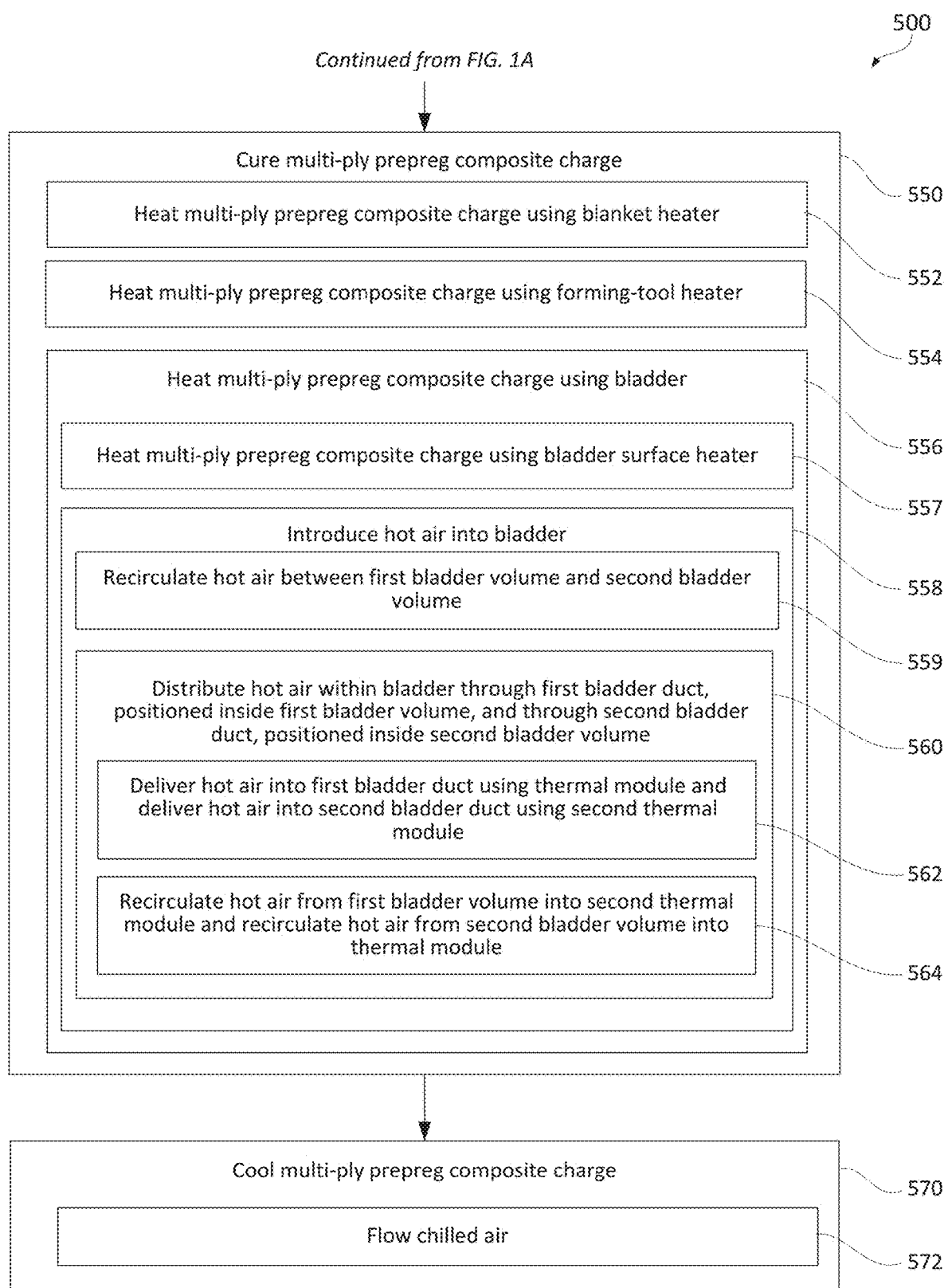
Figure 6:
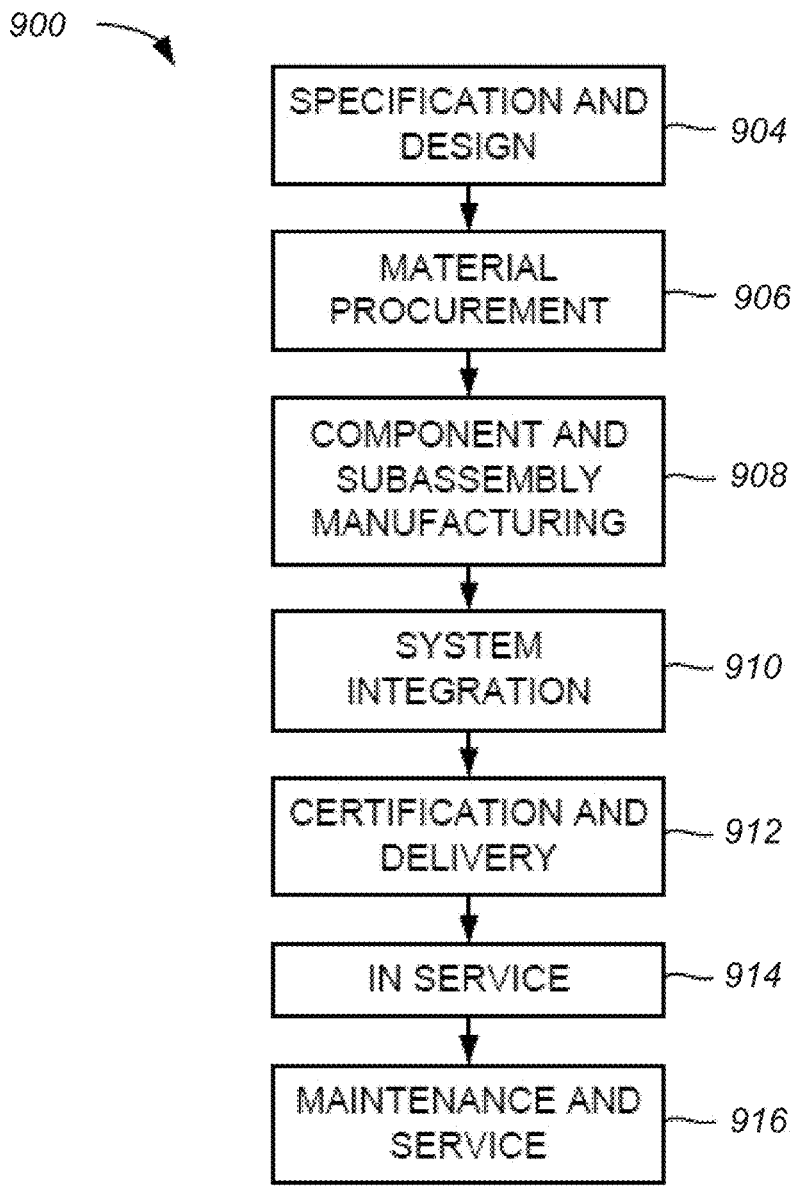
FIG. 6 is a block diagram of aircraft production and service methodology.

In FIGS. 1A, 1B, and 6, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 1A, 1B, and 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIGS. 1A and 1B and particularly to, e.g., FIGS. 2-4D for illustrative purposes only and not by way of limitation, the following portion of this paragraph delineates example 1 of the subject matter, disclosed herein. According to example 1, method 500 of forming composite part 195 from multi-ply prepreg composite charge 190 comprises (block 510) reducing the pressure inside bladder 140 located in chamber 100 that is at the atmospheric pressure, below the atmospheric pressure. Method 500 also comprises (block 520) placing multi-ply prepreg composite charge 190, having a first shape, in chamber 100. Method 500 further comprises (block 530) reducing the pressure inside chamber 100 below the atmospheric pressure. Method 500 additionally comprises, (block 540) while maintaining the pressure inside chamber 100 below the atmospheric pressure, expanding bladder 140 within chamber 100 by increasing the pressure inside bladder 140 to the atmospheric pressure, so that multi-ply prepreg composite charge 190 is compressed between bladder 140 and forming tool 130, which is located inside chamber 100, and multi-ply prepreg composite charge 190 is configured by forming tool 130 to a second shape, different from the first shape. Method 500 further comprises (block 550) curing multi-ply prepreg composite charge 190, having the second shape.

The operating sequence, presented above, enables degassing multi-ply prepreg composite charge 190 prior to forming mufti-ply prepreg composite charge 190. Specifically, the degassing is performed while at least a part of multi-ply prepreg composite charge 190 is exposed (e.g., the part facing forming tool 130). At this stage, multi-ply prepreg composite charge 190 is not yet compressed between bladder 140 and forming tool 130, and there are no restriction to the gas flow out of multi-ply prepreg composite charge 190. Once multi-ply prepreg composite charge 190 is compressed between bladder 140 and forming tool 130, the degassing efficiency decreases as the gas path becomes at least partially blocked by bladder 140 and forming tool 130. It should be noted that degassing continues even while multi-ply prepreg composite charge 190 is compressed between bladder 140 and forming tool 130, although the degassing at this stage is less efficient due to the gas path restriction, described above. However, the degassing starts and continues before multi-ply prepreg composite charge 190 is compressed between bladder 140 and forming tool 130. At this stage, the degassing is more efficient due to the lack of the above-mentioned gas path restriction. Furthermore, the degassing is performed without the need for additional equipment. In some examples, both bladder 140 and chamber 100 are equipped with independent vacuum lines, which enable the pressures inside bladder 140 and inside chamber 100 to be reduced independently.

Initially, chamber 100 is at the atmospheric pressure, e.g., chamber 100 is open and is ready to receive multi-ply prepreg composite charge 190. Bladder 140 is positioned inside chamber 100 and at least initially exposed to the atmosphere. When the pressure inside bladder 140 is reduced below at the atmospheric pressure, the atmospheric pressure within chamber 100 and outside bladder 140 compresses bladder 140, which can be also referred to as flattening of bladder 140. In some examples, bladder 140 is formed from a flexible material, which enables bladder 140 to change the shape and flatten based on the pressure difference inside bladder 140 and outside of bladder 140.

Figure 2:
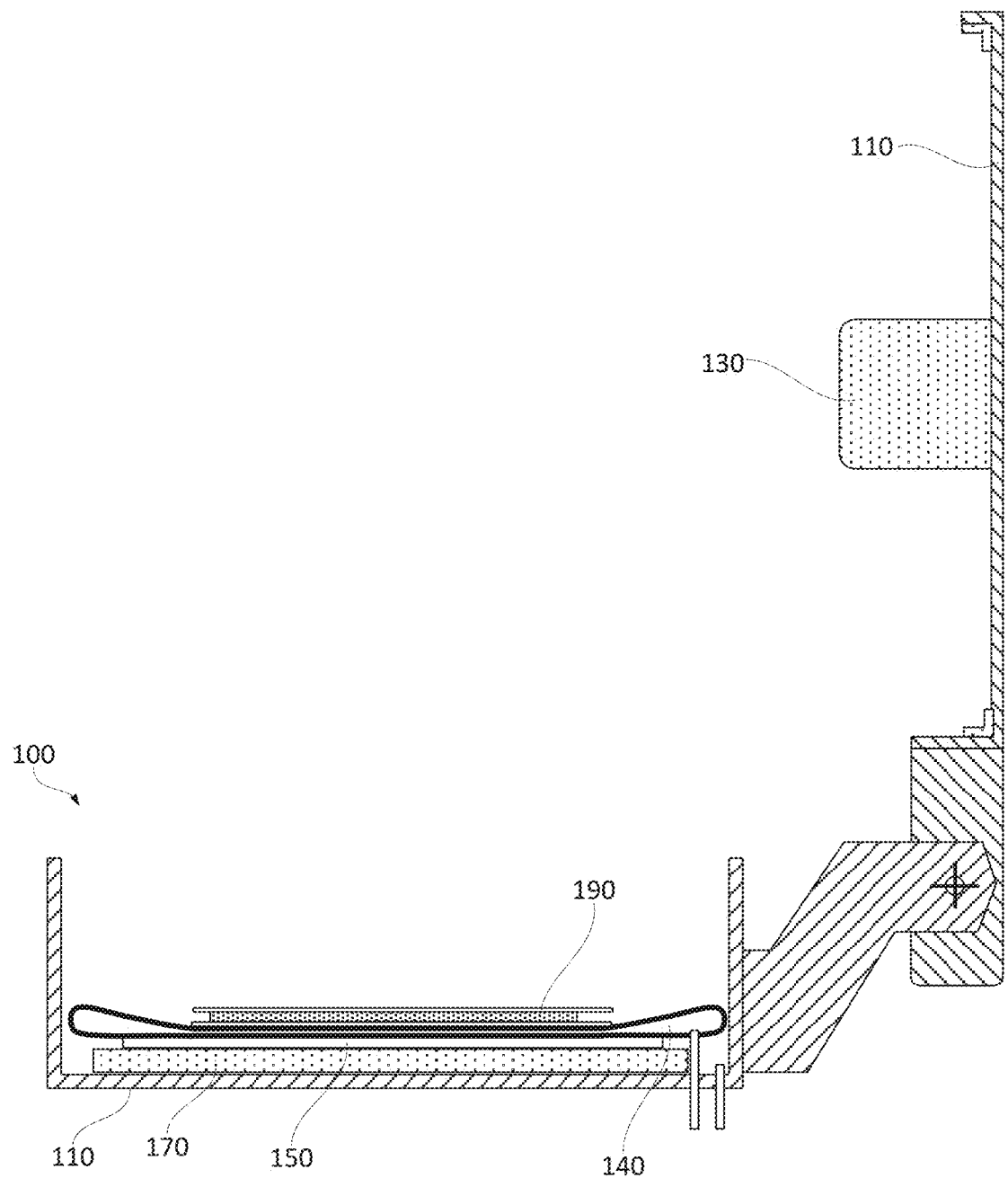
FIG. 2 is a schematic, cross-sectional view of a bladder, located inside a chamber, illustrating a step of reducing pressure inside the bladder in accordance with the method of FIGS. 1A and 1B, according to one or more examples of the subject matter, disclosed herein.

While bladder 140 is flattened, multi-ply prepreg composite charge 190 is placed into chamber 100. At this stage, multi-ply prepreg composite charge 190 has a first shape, e.g., a substantially flat shape. In some examples, multi-ply prepreg composite charge 190 is placed over bladder 140. This processing stage is shown in FIG. 2. Chamber 100 is open at this stage providing access to the interior of chamber 100, e.g., for placing multi-ply prepreg composite charge 190.

Figure 3A:
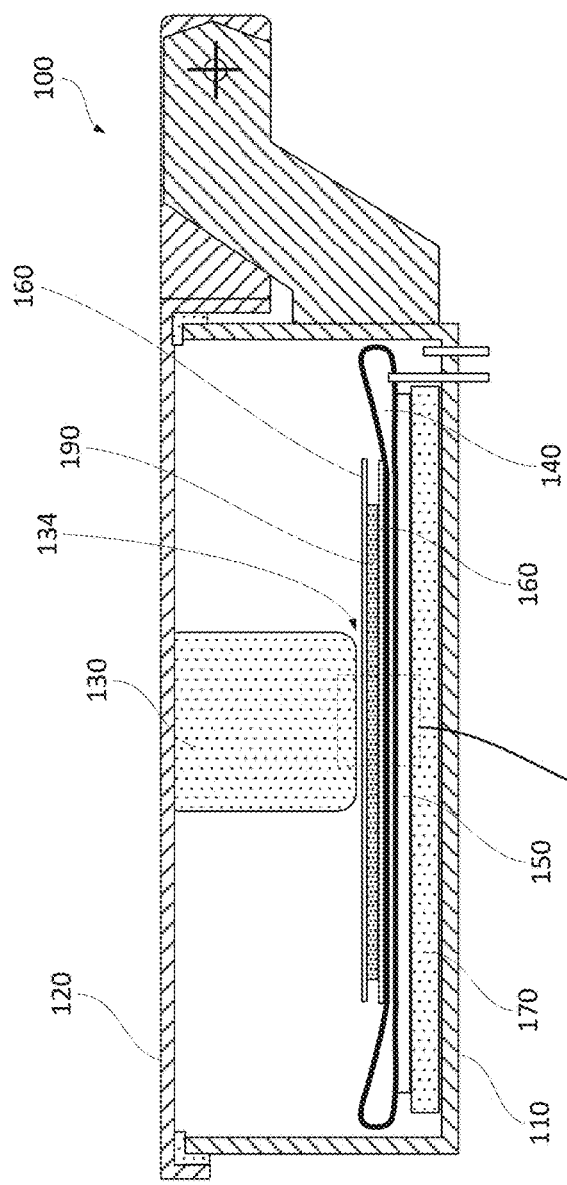
FIG. 3A is a schematic, cross-sectional view of a chamber illustrating a step of reducing pressure inside the chamber in accordance with the method of FIGS. 1A and 1B, according to one or more examples of the subject matter disclosed herein.

Method 500 then proceeds with reducing the pressure inside chamber 100 below the atmospheric pressure. Chamber 100 is sealed at this stage as, e.g., is shown in FIG. 3A. The pressure inside chamber 100 is reduced, e.g., by connecting the interior of chamber 100 to a vacuum source. It should be noted that bladder 140 remains below the atmospheric pressure at this stage. In some examples, the pressure inside bladder 140 and the pressure inside chamber 100 is the same at this stage, e.g., both are fluidically coupled to the same vacuum source. In other examples, the pressure inside bladder 140 is less than the pressure inside chamber 100 to ensure that the bladder remains flat.

At this stage, multi-ply prepreg composite charge 190 is exposed to the environment inside chamber 100, which is below the atmospheric pressure. At the same time, multi-ply prepreg composite charge 190 is at least partially exposed (e.g., not in contact with other components besides bladder 140). Furthermore, bladder 140 is not yet compressing multi-ply prepreg composite charge 190. This combination of factors enables efficient degassing of multi-ply prepreg composite charge 190, which can be referred to an initial degassing or pre-compression degassing. This initial degassing is performed for a period of time, which depends on various factors such as the thickness of multi-ply prepreg composite charge 190, material properties of multi-ply prepreg composite charge 190 (e.g., porosity, density, elasticity), required level of degassing, and the like. In some examples, the duration of this initial degassing is between one minute and one hour or, more specifically, between five minutes and thirty minutes.

Method 500 proceeds with the expansion of bladder 140 within chamber 100. This stage is schematically shown in FIGS. 4A-4E. The expansion of bladder 140 is accomplished by increasing the pressure inside bladder 140 to the atmospheric pressure, e.g., when bladder 140 is disconnected from the vacuum source and is fluidically coupled to the atmosphere. For example, bladder 140 comprises a line, extending from chamber 100 and connected to valve 186 or, more specifically, to a three-way valve. One port of this three-way valve is open to the atmosphere. Furthermore, this bladder expansion operation is performed while maintaining the pressure inside chamber 100 below the atmospheric pressure. The pressure inside bladder 140 being higher that the pressure inside chamber 100 (and outside bladder 140) causes bladder 140 to expand.

During this bladder expansion operation, multi-ply prepreg composite charge 190 is compressed between bladder 140 and forming tool 130 as, e.g., is schematically shown in FIGS. 4A-4E. More specifically, mufti-ply prepreg composite charge 190 is configured by forming tool 130 to a second shape, different from the first shape. In some examples, forming tool 130 defines the second shape of multi-ply prepreg composite charge 190. Specifically, during the bladder expansion operation, multi-ply prepreg composite charge 190 conforms to forming tool 130. It should be noted that the pressure inside chamber 100 is maintained below the atmospheric pressure during this operation thereby enabling further degassing of multi-ply prepreg composite charge 190. However, unlike the initial degassing (before expanding bladder 140 within chamber 100 and compressing multi-ply prepreg composite charge 190), this subsequent degassing is less efficient. The degassing path is now restricted by bladder 140 and forming tool 130, compressing multi-ply prepreg composite charge 190.

Method 500 further comprises curing multi-ply prepreg composite charge 190, having the second shape. In some examples, during this curing operation, multi-ply prepreg composite charge 190 is continuously compressed between bladder 140 and forming tool 130. Once the curing operation is complete, composite part 195 is formed (from multi-ply prepreg composite charge 190). Composite part 195, unlike multi-ply prepreg composite charge 190, is able to maintain the shape. As such, further support by bladder 140 and forming tool 130 is no longer needed for composite part 195.

Figure 3B:
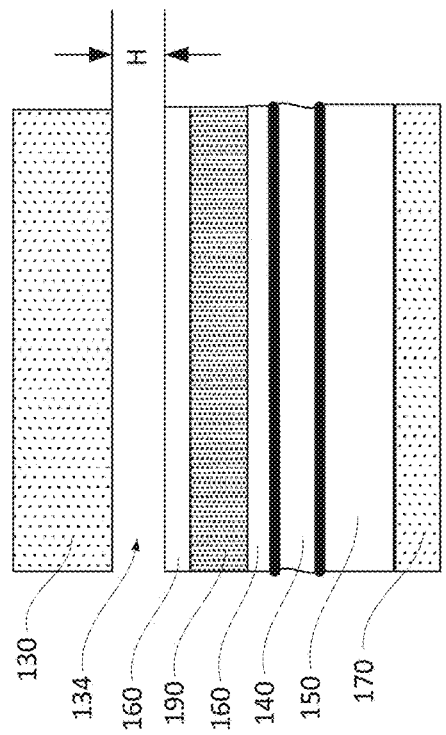
FIG. 3B is a schematic, expanded, cross-sectional view of the chamber of FIG. 3A, showing different components of the chamber, according to one or more examples of the subject matter, disclosed herein.

Referring generally to FIGS. 1A and 1B and particularly to, e.g., FIGS. 3A 3B for illustrative purposes only and not by way of limitation, the following portion of this paragraph delineates example 2 of the subject matter, disclosed herein. According to example 2, which encompasses example 1, above, during the step of (block 510) reducing the pressure inside chamber 100 below the atmospheric pressure, multi-ply prepreg composite charge 190 is separated from forming tool 130 by gap 134.

Gap 134 ensures that a portion of multi-ply prepreg composite charge 190, facing forming tool 130, remains exposed and is available for degassing or, more specifically, the initial degassing prior to compressing multi-ply prepreg composite charge 190. Once forming tool 130 comes in contact with multi-ply prepreg composite charge 190 and multi-ply prepreg composite charge 190 is compressed between bladder 140 and forming tool 130, the degassing path is more restricted and degassing is less efficient than the initial degassing.

In some examples, gap 134 is at least one millimeter or, more specifically, at least five millimeters. On one hand, a large gap is not needed as gases are able to effectively travel through narrow paths. However, a larger gap ensures that distortions in multi-ply prepreg composite charge 190 do not cause contact between forming tool 130 and multi-ply prepreg composite charge 190 thereby maintaining a continuous gas path within gap 134.

Referring generally to FIGS. 1A and 1B and particularly to, e.g., FIGS. 2A, 3A, and 3B for illustrative purposes only and not by way of limitation, the following portion of this paragraph delineates example 3 of the subject matter, disclosed herein. According to example 3, which encompasses example 2, above, chamber 100 comprises chamber housing 110 and chamber lid 120, coupled to chamber housing 110 and pivotable relative to chamber housing 110. The step of (block 530) reducing the pressure inside chamber 100 below the atmospheric pressure and the step of (block 550) expanding bladder 140 within chamber 100 by increasing the pressure inside bladder 140 to the atmospheric pressure while maintaining the pressure inside chamber 100 below the atmospheric pressure each comprise (block 532) providing a seal between chamber lid 120 and chamber housing 110. Forming tool 130 is attached to and is supported by chamber lid 120.

Attaching forming tool 130 to chamber lid 120 eliminates the need for separate support to forming tool 130. As such, no additional or special tools are needed to support and align forming tool 130 in chamber 100. Furthermore, the pivotable coupling of chamber lid 120 to chamber housing 110 enables opening and accessing chamber 100 while maintaining the relative orientation of chamber lid 120 and chamber housing 110. For example, chamber lid 120 is pivotably coupled to chamber housing 110 as, e.g., is shown in FIG. 2. Forming tool 130, being attached to and supported by chamber lid 120, remains aligned relative to chamber housing 110. In other words, when chamber lid 120 is sealed relative to chamber housing 110, forming tool 130 takes a designated position within chamber housing 110 and relative to multi-ply prepreg composite charge 190.

Referring generally to FIGS. 1A and 1B and particularly to, e.g., FIGS. 3A and 3B for illustrative purposes only and not by way of limitation, the following portion of this paragraph delineates example 4 of the subject matter, disclosed herein. According to example 4, which encompasses any one of examples 1 to 3, above, method 500 further comprises (block 538) heating mufti-ply prepreg composite charge 190 before expanding bladder 140 within cha 100.

Heating multi-ply prepreg composite charge 190 before expanding bladder 140 within chamber 100 helps with degassing multi-ply prepreg composite charge 190, e.g., by softening multi-ply prepreg composite charge 190 and enabling trapped bubbles to travel to the surface of multi-ply prepreg composite charge 190. As shown in FIGS. 3A and 3B, forming tool 130 is not in contact with multi-ply prepreg composite charge 190 at this stage and the entire top surface of multi-ply prepreg composite charge 190 is exposed or covered by a permeable component, thereby enabling gasses to escape from multi-ply prepreg composite charge 190.

In some examples, multi-ply prepreg composite charge 190 is heated to a temperature and for a duration that does not trigger or cause significant curing of multi-ply prepreg composite charge 190. For example, multi-ply prepreg composite charge 190 is heated to between about 50% and 80% of the curing temperature during this heating-while-degassing operation.

Referring generally to FIGS. 1A and 1B and particularly to, e.g., FIGS. 3A and 3B for illustrative purposes only and not by way of limitation, the following portion of this paragraph delineates example 5 of the subject matter, disclosed herein. According to example 5, which encompasses example 4, above, (block 538) heating multi-ply prepreg composite charge 190 before expanding bladder 140 within chamber 100 is performed after (block 530) reducing the pressure inside chamber 100 below the atmospheric pressure.

Heating multi-ply prepreg composite charge 190 before expanding bladder 140 within chamber 100 helps with degassing multi-ply prepreg composite charge 190. As shown in FIGS. 3A and 3B, forming tool 130 is not in contact with multi-ply prepreg composite charge 190 at this stage and the entire surface of multi-ply prepreg composite charge 190 is exposed or covered by a permeable component, thereby enabling gasses to escape from multi-ply prepreg composite charge 190. Furthermore, the heating helps to soften multi-ply prepreg composite charge 190 thereby enhancing the degassing. Finally, the heating helps with the shaping of multi-ply prepreg composite charge 190, e.g., also by softening multi-ply prepreg composite charge 190. However, the heating is restricted to avoid premature curing (e.g., curing before forming) of multi-ply prepreg composite charge 190. Specifically, the duration of heating at this stage is minimized by first reducing the pressure inside chamber 100 below the atmospheric pressure and only then initiating the heating.

In some examples, multi-ply prepreg composite charge 190 is heated to a temperature and for a duration that does not trigger or cause significant curing of multi-ply prepreg composite charge 190. For example, multi-ply prepreg composite charge 190 is heated to between about 50% and 80% of the curing temperature during this heating-while-degassing operation.

Referring generally to FIGS. 1A and 1B and particularly to, e.g., FIGS. 3A and 3A for illustrative purposes only and not by way of limitation, the following portion of this paragraph delineates example 6 of the subject matter, disclosed herein. According to example 5, which encompasses example 4, above, (block 538) heating multi-ply prepreg composite charge 190 before expanding bladder 140 within chamber 100 and (block 530) reducing the pressure inside chamber 100 below the atmospheric pressure are performed concurrently.

The concurrent heating of multi-ply prepreg composite charge 190 and reducing the pressure inside chamber 100 (to degas multi-ply prepreg composite charge 190) helps to reduce the overall processing time. Furthermore, the heating (at this stage) helps to soften multi-ply prepreg composite charge 190 thereby enhancing the initial degassing and also helping with the later shaping of multi-ply prepreg composite charge 190.

In some examples, heating multi-ply prepreg composite charge 190 and reducing the pressure start at the same time. Alternatively, heating multi-ply prepreg composite charge 190 and reducing the pressure are staggered but overlap. For example, heating multi-ply prepreg composite charge 190 starts before reducing the pressure. Alternatively, reducing the pressure starts before heating multi-ply prepreg composite charge 190.

Referring generally to FIGS. 1A and 1B and particularly to, e.g., FIGS. 3A and 3B for illustrative purposes only and not by way of limitation, the following portion of this paragraph delineates example 7 of the subject matter, disclosed herein. According to example 7, which encompasses any one of examples 4 to 6, above, (block 538) heating multi-ply prepreg composite charge 190 before expanding bladder 140 within chamber 100 is performed using heater 150. Bladder 140 is positioned between heater 150 and multi-ply prepreg composite charge 190.

Positioning bladder 140 between heater 150 and multi-ply prepreg composite charge 190 enabling separating heater 150 from bladder 140 thereby simplifying the overall design of the apparatus. At this stage, bladder 140 is flattened and the heat transfer goes through two walls of bladder 140. One of these walls faces heater 150, while the other one faces multi-ply prepreg composite charge 190. Bladder 140 is also operable as a heat spreader, effectively reducing the temperature gradient experienced by multi-ply prepreg composite charge 190.

In some examples, heater 150 is a stand-alone component. For example, heater 150 is attached to and/or supported relative to chamber housing 110. For example, FIG. 3A illustrates heat insulator 170 positioned between chamber housing 110 and heater 150. Various types of heater 150 are within scope, e.g., a resistive heater, a fluid-based heater, and the like.

Figure 3C:
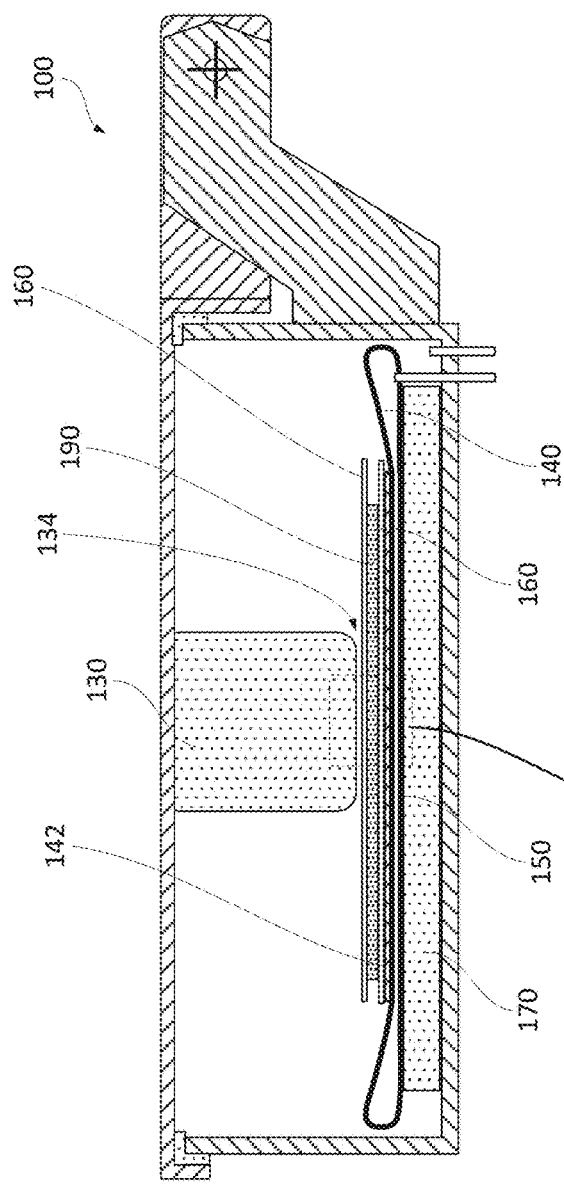
FIG. 3C and FIG. 3D are schematic, cross-sectional views of a chamber illustrating a step of reducing pressure inside the chamber in accordance with the method FIGS. 1A and 1B, according to one or more examples of the subject matter, disclosed herein.
Figure 3D:
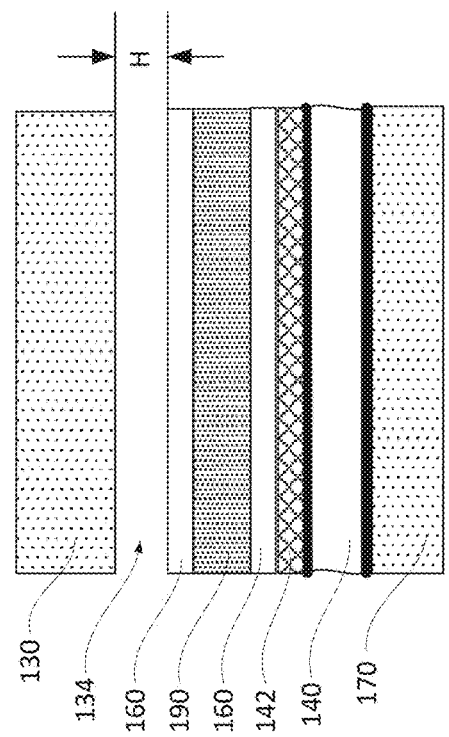

Referring generally to FIGS. 1A and 1B and particularly to, e.g., FIGS. 3C and 3D for illustrative purposes only and not by way of limitation, the following portion of this paragraph delineates example 8 of the subject matter, disclosed herein. According to example 8, which encompasses any one of examples 4 to 7, above, (block 538) heating multi-ply prepreg composite charge 190 before expanding bladder 140 within chamber 100 is performed using bladder surface heater 142, incorporated into bladder 140.

Incorporating bladder surface heater 142 into bladder 140 reduces the number of components. Furthermore, this incorporation enables positioning bladder surface heater 142 close to multi-ply prepreg composite charge 190 for effective heating that does not requires heat transfer through the walls of bladder 140. In some examples, bladder surface heater 142 faces multi-ply prepreg composite charge 190. In some specific examples, bladder surface heater 142 directly contacts multi-ply prepreg composite charge 190. One example of bladder surface heater 142 is a resistive heater.

Figure 3E:
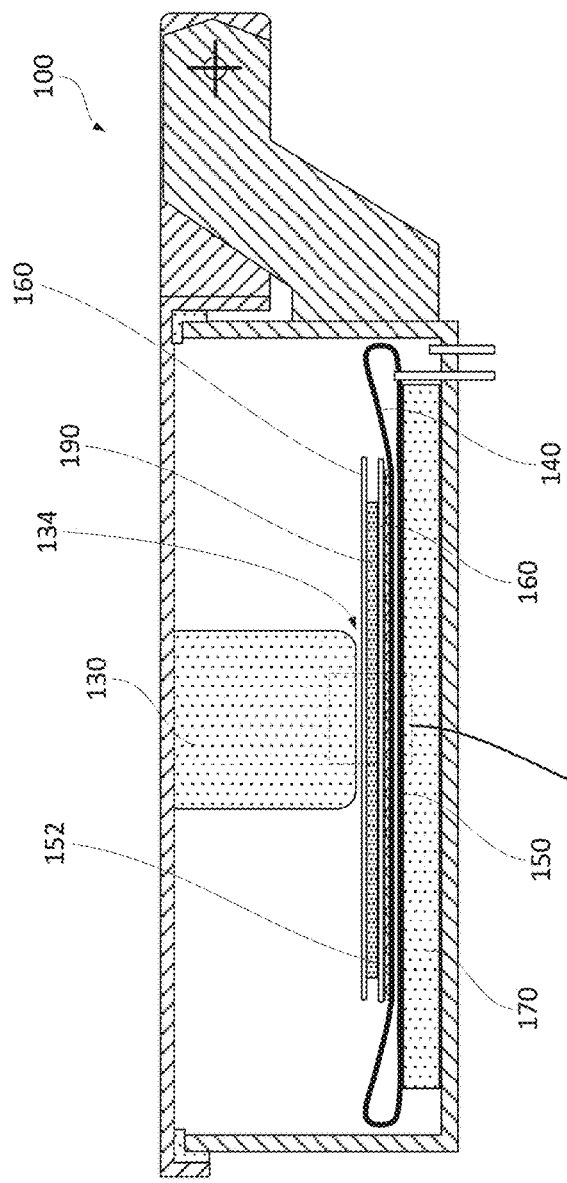
FIG. 3E and FIG. 3F are schematic, cross-sectional views of a chamber illustrating a step of reducing pressure inside the chamber in accordance with the method FIGS. 1A and 1B, according to one or more examples of the subject matter, disclosed herein.
Figure 3F:
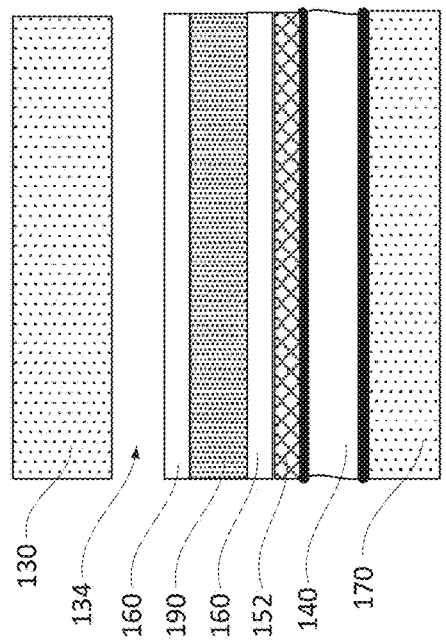

Referring generally to FIGS. 1A and 1B and particularly to, e.g., FIGS. 3E and 3F for illustrative purposes only and not by way of limitation, the following portion of this paragraph delineates example 9 of the subject matter, disclosed herein. According to example 9, which encompasses any one of examples 4 to 7, above, (block 538) heating multi-ply prepreg composite charge 190 before expanding bladder 140 within chamber 100 is performed using blanket heater 152, positioned between bladder 140 and multi-ply prepreg composite charge 190.

Blanket heater 152 is positioned adjacent to mufti-ply prepreg composite charge 190 and during some operating steps, interfacing multi-ply prepreg composite charge 190 for effective heating that does not requires heat transfer through the wars of bladder 140. Separating blanket heater 152 from bladder 140 enables new designs for blanket heater 152 from bladder 140, which are not limited by integrations of these two components. In some examples, blanket heater 152 faces multi-ply prepreg composite charge 190. In some specific examples, blanket heater 152 directly contacts multi-ply prepreg composite charge 190. One example of blanket heater 152 directly is a resistive heater.

Referring generally to FIGS. 1A and 1B and particularly to, e.g., FIGS. 4B and 4C for illustrative purposes only and not by way of limitation, the following portion of this paragraph delineates example 10 of the subject matter, disclosed herein. According to example 10, which encompasses example 9, above, (block 550) curing multi-ply prepreg composite charge 190 comprises (block 552) heating multi-ply prepreg composite charge 190 using blanket heater 152, positioned between multi-ply prepreg composite charge 190 and forming tool 130.

Blanket heater 152 provides the localized and direct heating to multi-ply prepreg composite charge 190 without heating other components, in particular, without heating bulk components, such as forming tool 130. This direct heating increase the processing speed (e.g., by reaching the desired temperature faster) and saves energy (e.g., by heating fewer component). Furthermore, the direct heating eliminates the need for cooling components in between processing cycles.

In some examples, blanket heater 152 directly contacts multi-ply prepreg composite charge 190. In some examples, blanket heater 152 is supported by forming tool 130, e.g., blanket heater 152 wraps around forming tool 130. At the same time, the heating element of blanket heater 152 is thermally isolated from forming tool 130. One example of blanket heater 152 directly is a resistive heater.

Figure 4A:
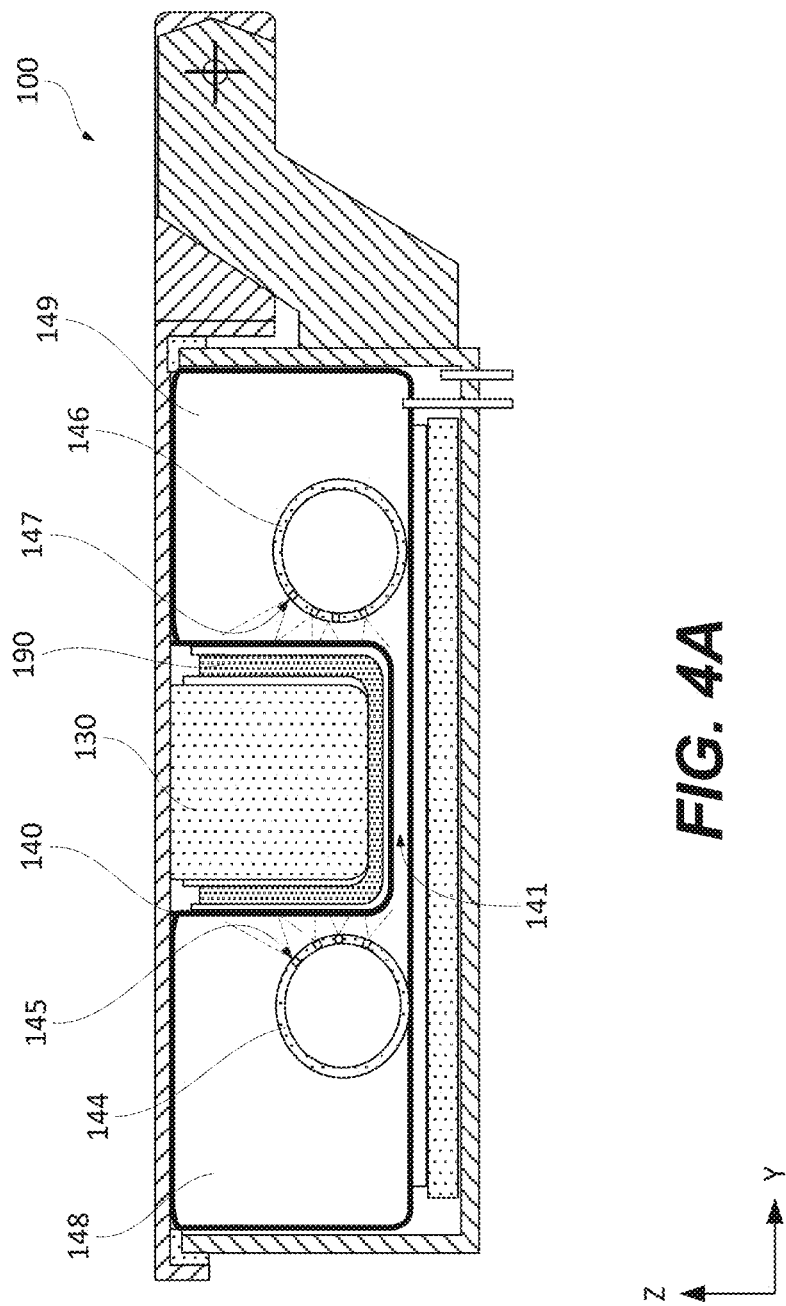

Referring generally to FIGS. 1A and 1B and particularly to, e.g., FIGS. 4A and 4B for illustrative purposes only and not by way of limitation, the following portion of this paragraph delineates example 11 of the subject matter, disclosed herein. According to example 11, which encompasses any one of examples 1 to 10, above, (block 540) expanding bladder 140 within chamber 100 comprises (block 542) fluidically coupling bladder 140 to the atmosphere.

Fluidically coupling bladder 140 to the atmosphere does not require complex or extra equipment. Bladder 140 is simply vented to the atmosphere, which causes bladder 140 to expand within chamber 100. It should be noted that the pressure inside chamber 100 is below the atmospheric pressure, bladder 140 is pressurized from within bladder 140. For example, a line, extending into bladder 140, is connected to a three-way valve, which fluidically coupled the interior of bladder 140 to the atmosphere (in the instant operation) or to a vacuum source (at other operations).

Referring generally to FIGS. 1A and 1B and particularly to, e.g., FIGS. 4B and 4C for illustrative purposes only and not by way of limitation, the following portion of this paragraph delineates example 12 of the subject matter, disclosed herein. According to example 12, which encompasses any one of examples 1 to 11, above, (block 550) curing multi-ply prepreg composite charge 190 comprises (block 554) heating multi-ply prepreg composite charge 190 using forming-tool heater 132, incorporated into forming tool 130.

While multi-ply prepreg composite charge 190 is being cured, multi-ply prepreg composite charge 190 conforms to and forced against forming tool 130 thereby ensuring good heat transfer between multi-ply prepreg composite charge 190 and forming tool 130. Using forming tool 130 or, more specifically, forming-tool heater 132 incorporated into forming tool 130 relies on this heat transfer between multi-ply prepreg composite charge 190 and forming tool 130. Furthermore, in some examples, forming tool 130 is preheated before contacting multi-ply prepreg composite charge 190. This preheating feature reduces the overall processing time by eliminating the heating period.

In some examples, forming-tool heater 132 is a resistive heater. However, other types of heaters are also within the scope the disclosure. In some examples, forming-tool heater 132 is positioned adjacent to the surface of forming tool 130, which contacts multi-ply prepreg composite charge 190, Furthermore, forming-tool heater 132 is uniformly distributed along this surface. For example, forming-tool heater 132 comprises multiple heating elements as, e.g., is shown in FIG. 4C.

Referring generally to FIGS. 1A and 1B and particularly to, e.g., FIGS. 4B, 4C, 40, and 4E for illustrative purposes only and not by way of limitation, the following portion of this paragraph delineates example 13 of the subject matter, disclosed herein. According to example 13, which encompasses any one of examples 1 to 12, above, (block 550) curing multi-ply prepreg composite charge 190 comprises (block 556) heating mufti-ply prepreg composite charge 190 using bladder 140.

While mufti-ply prepreg composite charge 190 is being cured, multi-ply prepreg composite charge 190 conforms to and forced on by bladder 140 thereby ensuring good heat transfer between mufti-ply prepreg composite charge 190 and bladder 140. Furthermore, using bladder 140 as a heating source eliminates the need to heat other components, especially bulky components, such as forming tool 130 thereby increasing the overall processing speed.

In some examples, bladder 140 is heated using an integrated heater. Alternatively, bladder 140 is heated by supplying hot air into bladder 140. For example, air is heated outside bladder 140 and then introduced into bladder 140.

Referring generally to FIGS. 1A and 1B and particularly to, e.g., FIGS. 4B and 4C for illustrative purposes only and not by way of limitation, the following portion of this paragraph delineates example 14 of the subject matter, disclosed herein. According to example 14, which encompasses example 13, above, (block 556) heating multi-ply prepreg composite charge 190 using bladder 140 comprises (block 557) heating mufti-ply prepreg composite charge 190 using bladder surface heater 142, incorporated into bladder 140.

While multi-ply prepreg composite charge 190 is being cured, multi-ply prepreg composite charge 190 conforms to and forced on by bladder 140 thereby ensuring good heat transfer between mufti-ply prepreg composite charge 190 and bladder 140. For example, bladder surface heater 142 is positioned on the surface of bladder 140 that contacts multi-ply prepreg composite charge 190. Furthermore, using bladder 140 as a heating source eliminates the need to heat other components, especially bulky components, such as forming tool 130 thereby increasing the overall processing speed.

In some examples, bladder surface heater 142 is a resistive heater. However, other types of heaters are also within the scope of the disclosure. In some examples, bladder surface heater 142 is integrated into bladder 140, e.g., forming a surface of bladder 140.

Figure 4D:
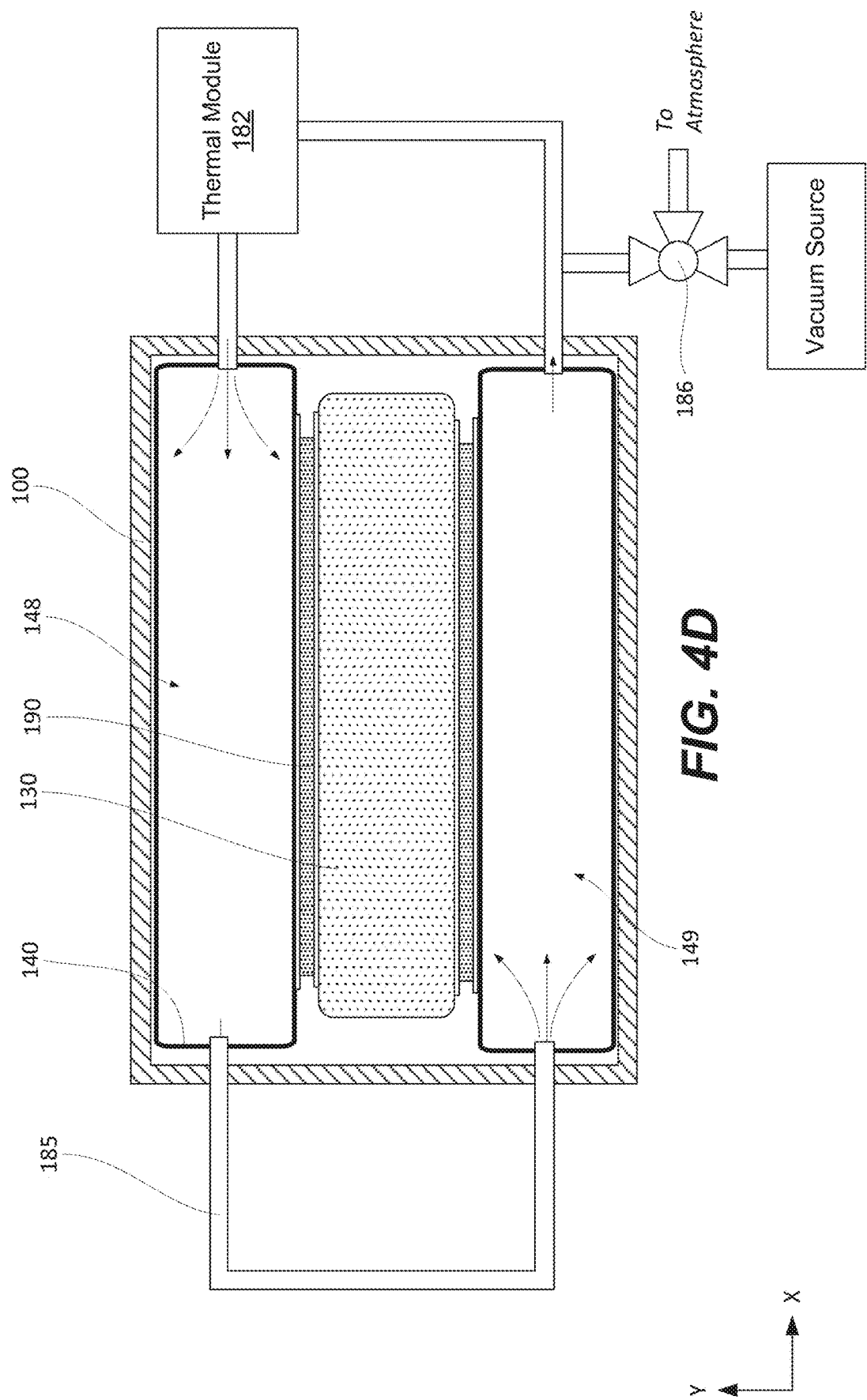
FIGS. 4D and 4E are two schematic, cross-sectional views of a chamber illustrating a step of expanding a bladder within the chamber in accordance with the method FIGS. 1A and 1B, according to one or more examples of the subject matter, disclosed herein.
Figure 4E:
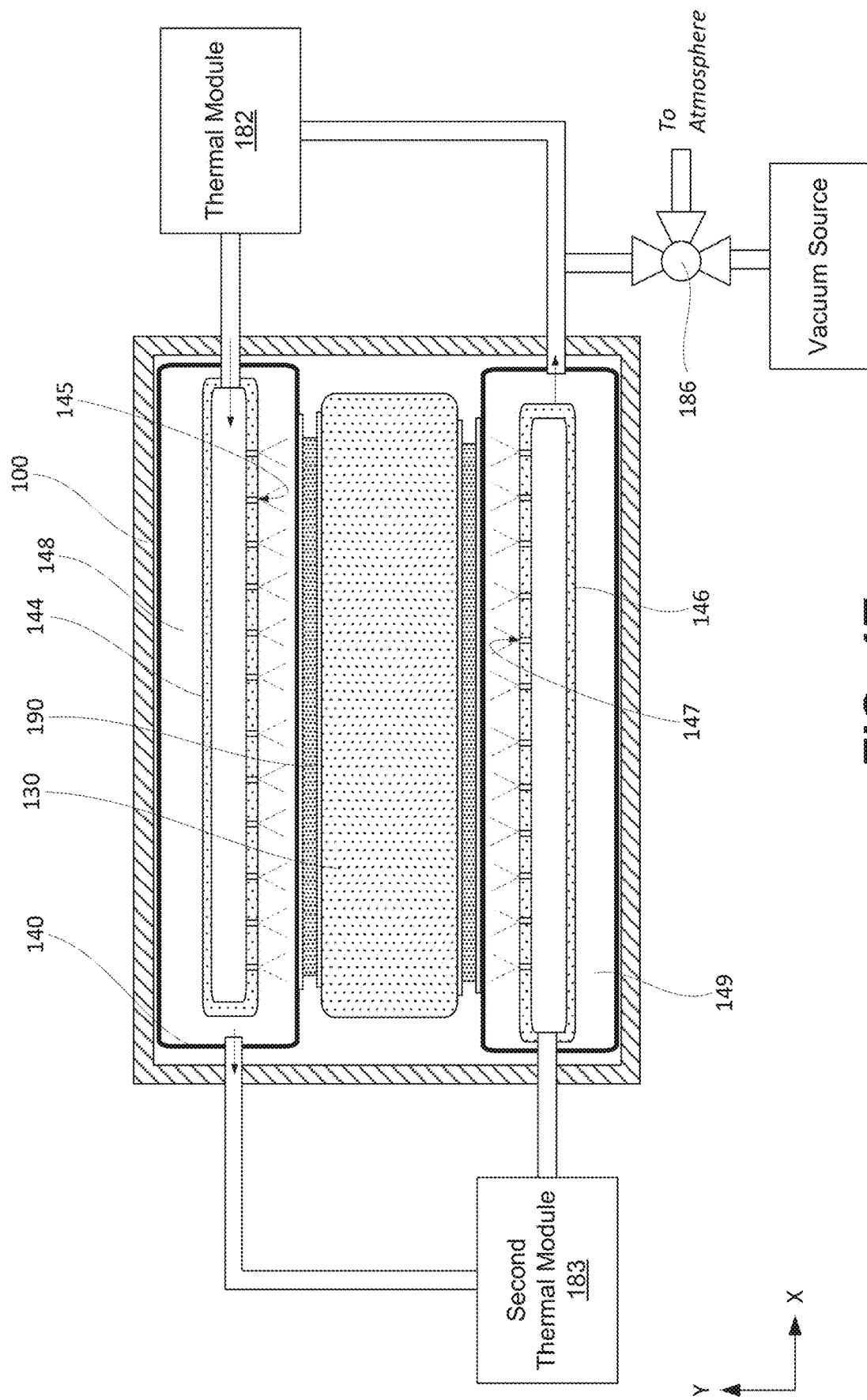

Referring generally to FIGS. 1A and 1B and particularly to, e.g., FIGS. 4D and 4E for illustrative purposes only and not by way of limitation, the following portion of this paragraph delineates example 15 of the subject matter, disclosed herein. According to example 15, which encompasses example 13, above, (block 556) heating multi-ply prepreg composite charge 190 using bladder 140 comprises (block 558) introducing hot air into bladder 140.

While multi-ply prepreg composite charge 190 is being cured, multi-ply prepreg composite charge 190 conforms to and forced on by bladder 140 thereby ensuring good heat transfer between multi-ply prepreg composite charge 190 and bladder 140. Introducing the hot air into bladder 140 provides uniform heating of bladder 140 and, as a result of this heat transfer, also provides uniform heating of multi-ply prepreg composite charge 190. In some examples, the air is heated outside bladder 140 and then introduced into bladder 140.

Referring generally to FIGS. 1A and 1B and particularly to, e.g., FIGS. 4D and 4E for illustrative purposes only and not by way of limitation, the following portion of this paragraph delineates example 16 of the subject matter, disclosed herein. According to example 16, which encompasses example 15, above, after (block 540) expanding bladder 140 within chamber 100 by increasing pressure inside bladder 140 to atmospheric pressure, bladder 140 comprises first bladder volume 148 and second bladder volume 149 such that forming tool 130 is positioned between first bladder volume 148 and second bladder volume 149. The step of (block 558) introducing hot air into bladder 140 comprises (block 559) recirculating the hot air between first bladder volume 148 and second bladder volume 149.

Recirculating the hot air between first bladder volume 148 and second bladder volume 149 of bladder 140 established a closed-loop system, which is more energy efficient than a system that continuously draws more air from the environment. Furthermore, recirculating the hot air between first bladder volume 148 and second bladder volume 149 ensures the uniform temperature distribution within bladder 140 and, as a result, on multi-ply prepreg composite charge 190.

In some examples, additional air is supplied or removed from bladder 140 based on the pressure within bladder 140, which is monitored. For example, the pressure inside bladder 140 is kept at the atmospheric pressure level.

Referring generally to FIGS. 1A and 1B and particularly to, e.g., FIGS. 4D and 4E for illustrative purposes only and not by way of limitation, the following portion of this paragraph delineates example 17 of the subject matter, disclosed herein. According to example 17, which encompasses example 16, above, (block 559) recirculating hot air between first bladder volume 148 and second bladder volume 149 is performed using thermal module 182, fluidically coupled to first bladder volume 148 and second bladder volume 149.

Thermal module 182 ensures that the temperature of the hot air, recirculated between first bladder volume 148 and second bladder volume 149, is a set point. For example, the air is cooled while the air travels through bladder 140 (e.g., either through first bladder volume 148 or second bladder volume 149) to heat the walls of bladder 140 and provide heat to multi-ply prepreg composite charge 190. As the air leaves bladder 140, thermal module 182 reheats the air back to the set point.

In some examples, thermal module 182 is equipped with a heater (e.g., a resistive heater). Furthermore, in some examples, thermal module 182 is equipped with a blower to force the hot air and to recirculate the hot air between first bladder volume 148 and second bladder volume 149 of bladder 140.

Referring generally to FIGS. 1A and 1B and particularly to, e.g., FIG. 4D for illustrative purposes only and not by way of limitation, the following portion of this paragraph delineates example 18 of the subject matter, disclosed herein. According to example 18, which encompasses example 17, above, first bladder volume 148 is fluidically coupled to second bladder volume 149 via duct 185, external to bladder 140.

Duct 185 fluidically couples first bladder volume 148 to second bladder volume 149 and ensures that the hot air is able to recirculate the hot air between first bladder volume 148 and second bladder volume 149 of bladder 140.

In some examples, duct 185 protrudes into each first bladder volume 148 and second bladder volume 149. Furthermore, duct 185 extends outside chamber 100 to avoid interference with bladder 140 and other components.

Referring generally to FIGS. 1A and 1B and particularly to, e.g., FIG. 4A for illustrative purposes only and not by way of limitation, the following portion of this paragraph delineates example 19 of the subject matter, disclosed herein. According to example 19, which encompasses example 17 or 18, above, first bladder volume 148 is fluidically coupled to second bladder volume 149 via passage 141, internal to bladder 140.

Passage 141 fluidically couples first bladder volume 148 to second bladder volume 149 and ensures that the hot air is able to recirculate the hot air between first bladder volume 148 and second bladder volume 149 of bladder 140. Furthermore, passage 141 heats a portion of bladder 140, extending between first bladder volume 148 and second bladder volume 149 thereby ensuring that all surfaces of multi-ply prepreg composite charge 190 are heated.

In some examples, the height of passage 141 is the same as the gap between multi-ply prepreg composite charge 190 and forming tool 130. As such, the height of passage 141 by the design of forming tool 130. In some examples, the height of passage 141 varies along the length of the chamber (the X direction) to ensure uniform flow of the hot air through passage 141.

Referring generally to FIGS. 1A and 1B and particularly to, e.g., FIG. 4E for illustrative purposes only and not by way of limitation, the following portion of this paragraph delineates example 20 of the subject matter, disclosed herein. According to example 20, which encompasses example 16, above, (block 559) recirculating the hot air between first bladder volume 148 and second bladder volume 149 is performed using thermal module 182, fluidically coupled to first bladder volume 148 and second bladder volume 149, and second thermal module 183, fluidically coupled to first bladder volume 148 and second bladder volume 149.

Thermal module 182 and second thermal module 183 ensure that the temperature of the hot air, recirculated between first bladder volume 148 and second bladder volume 149, is a set point. For example, the air is cooled while the air travels through bladder 140 (e.g., either through first bladder volume 148 or second bladder volume 149) to heat the walls of bladder 140 and provide heat to multi-ply prepreg composite charge 190. As the air leaves first bladder volume 148, second thermal module 183 reheats the air back to the set point before reintroducing the air into second bladder volume 149. Similarly, as the air leaves second bladder volume 149, thermal module 182 reheats the air back to the set point before reintroducing the air into first bladder volume 148.

In some examples, each of thermal module 182 and second thermal module 183 is equipped with a heater (e.g., a resistive heater). Furthermore, in some examples, each of thermal module 182 and second thermal module 183 is equipped with a blower to force the hot air and to recirculate the hot air between first bladder volume 148 and second bladder volume 149 of bladder 140.

Referring generally to FIGS. 1A and 1B and particularly to, e.g., FIGS. 4A and 4E for illustrative purposes only and not by way of limitation, the following portion of this paragraph delineates example 21 of the subject matter, disclosed herein. According to example 21, which encompasses any one of examples 16 to 19, above, (block 558) introducing the hot air into bladder 140 comprises (block 560) distributing the hot air within bladder 140 through first bladder duct 144, positioned inside first bladder volume 148, and through second bladder duct 146, positioned inside second bladder volume 149.

First bladder duct 144 and second bladder duct 146 control the hot-air distribution within bladder 140 thereby reducing the overall heating of the tool and energy consumption. In some examples, each of first bladder duct 144 and second bladder duct 146 is a perforated tube.

Referring generally to FIGS. 1A and 1B and particularly to, e.g., FIGS. 4A and 4E for illustrative purposes only and not by way of limitation, the following portion of this paragraph delineates example 22 of the subject matter, disclosed herein. According to example 22, which encompasses example 21, above, the hot air is directed by first bladder duct 144 and second bladder duct 146 toward multi-ply prepreg composite charge 190.

First bladder duct 144 and second bladder dud 146 control the hot-air distribution within bladder 140 thereby reducing the overall heating of the tool and energy consumption. In some examples, each of first bladder duct 144 and second bladder duct 146 is a perforated tube directing the hot air toward multi-ply prepreg composite charge 190 for curing multi-ply prepreg composite charge 190.

Referring generally to FIGS. 1A and 1B and particularly to, e.g., FIGS. 4A and 4E for illustrative purposes only and not by way of limitation, the following portion of this paragraph delineates example 23 of the subject matter, disclosed herein. According to example 23, which encompasses example 22, above, first bladder duct 144 comprises first-bladder-duct openings 145, and second bladder duct 146 comprises second-bladder-duct openings 147 in only those respective portions of first bladder duct 144 and second bladder duct 146 that face multi-ply prepreg composite charge 190 when the hot air is distributed within bladder 140.

First bladder duct 144 and second bladder duct 146 control the hot-air distribution within bladder 140 thereby reducing the overall heating of the tool and energy consumption. In some examples, each of first bladder duct 144 and second bladder duct 146 is a perforated tube. Specifically, the perforations of first bladder duct 144 are represented by first-bladder-duct openings 145. The perforations of second bladder duct 146 are represented by second-bladder-duct openings 147.

Referring generally to FIGS. 1A and 1B and particularly to, e.g., FIGS. 4A and 4F for illustrative purposes only and not by way of limitation, the following portion of this paragraph delineates example 24 of the subject matter, disclosed herein. According to example 24, which encompasses any one of examples 21 to 23, above, (block 530) reducing the pressure inside bladder 140 below the atmospheric pressure comprises (block 536) collapsing first bladder duct 144 and second bladder duct 146.

Collapsing first bladder duct 144 and second bladder duct 146 ensures that first bladder duct 144 and second bladder duct 146 does not interfere with the operation of bladder 140 when placing multi-ply prepreg composite charge 190 in chamber 100. In some examples, bladder 140 is substantially flat when placing multi-ply prepreg composite charge 190 in chamber 100.

Referring generally to FIGS. 1A and 1B and particularly to, e.g., FIG. 4E for illustrative purposes only and not by way of limitation, the following portion of this paragraph delineates example 25 of the subject matter, disclosed herein. According to example 25, which encompasses any one of examples 21 to 24, above, (block 560) distributing the hot air within bladder 140 through first bladder duct 144, positioned inside first bladder volume 148, and through second bladder duct 146, positioned inside second bladder volume 149 comprises (block 562) delivering the hot air into first bladder duct 144 using thermal module 182 and delivering the hot air into second bladder duct 146 using second thermal module 183.

Thermal module 182 and second thermal module 183 ensure that the temperature of the hot air, recirculated between first bladder volume 148 and second bladder volume 149, is a set point. For example, the air is cooled while the air travels through bladder 140 (e.g., either through first bladder volume 148 or second bladder volume 149) to heat the walls of bladder 140 and provide heat to multi-ply prepreg composite charge 190. As the air leaves first bladder volume 148, second thermal module 183 reheats the air back to the set point before reintroducing the air into second bladder volume 149. Similarly, as the air leaves second bladder volume 149, thermal module 182 reheats the air back to the set point before reintroducing the air into first bladder volume 148.

In some examples, each of thermal module 182 and second thermal module 183 is equipped with a heater (e.g., a resistive heater). Furthermore, in some examples, each of thermal module 182 and second thermal module 183 is equipped with a blower to force the hot air and to recirculate the hot air between first bladder volume 148 and second bladder volume 149 of bladder 140.

Referring generally to FIGS. 1A and 1B and particularly to, e.g., FIG. 4E for illustrative purposes only and not by way of limitation, the following portion of this paragraph delineates example 26 of the subject matter, disclosed herein. According to example 26, which encompasses example 25, above, (block 560) distributing the hot air within bladder 140 through first bladder duct 144, positioned inside first bladder volume 148, and through second bladder duct 146, positioned inside second bladder volume 149, further comprises (block 564) recirculating the hot air from first bladder volume 148 into second thermal module 183 and recirculating hot air from second bladder volume 149 into thermal module 182.

Thermal module 182 and second thermal module 183 ensure that the temperature of the hot air, recirculated between first bladder volume 148 and second bladder volume 149, is a set point. For example, the air is cooled while the air travels through bladder 140 (e.g., either through first bladder volume 148 or second bladder volume 149) to heat the walls of bladder 140 and provide heat to multi-ply prepreg composite charge 190. As the air leaves first bladder volume 148, second thermal module 183 reheats the air back to the set point before reintroducing the air into second bladder volume 149. Similarly, as the air leaves second bladder volume 149, thermal module 182 reheats the air back to the set point before reintroducing the air into first bladder volume 148.

In some examples, each of thermal module 182 and second thermal module 183 is equipped with a heater (e.g., a resistive heater), Furthermore, in some examples, each of thermal module 182 and second thermal module 183 is equipped with a blower to force the hot air and to recirculate the hot air between first bladder volume 148 and second bladder volume 149 of bladder 140.

Referring generally to FIGS. 1A and 1B and particularly to, e.g., FIG. 4B for illustrative purposes only and not by way of limitation, the following portion of this paragraph delineates example 27 of the subject matter, disclosed herein. According to example 27, which encompasses example 26, above, method 500 also comprises, after (block 550) curing multi-ply prepreg composite charge 190, (block 570) cooling multi-ply prepreg composite charge 190.

Cooling multi-ply prepreg composite charge 190 ensures that multi-ply prepreg composite charge 190 preserves the second shape, e.g., after bladder 140 no longer supports mufti-ply prepreg composite charge 190. In some examples, multi-ply prepreg composite charge 190 is cooled while multi-ply prepreg composite charge 190 is compressed between bladder 140 and forming tool 130. More specifically, multi-ply prepreg composite charge 190 remains configured by forming tool 130 to the second shape while being cooled.

Referring generally to FIGS. 1A and 1B and particularly to, e.g., FIGS. 4D and 4E for illustrative purposes only and not by way of limitation, the following portion of this paragraph delineates example 28 of the subject matter, disclosed herein. According to example 28, which encompasses example 27, above, (block 570) cooling multi-ply prepreg composite charge 190 comprises (block 572) flowing chilled air into bladder 140.

Flowing the chilled air into bladder 140 ensures the uniform cooling of bladder 140 and, as a result, the uniform cooling of multi-ply prepreg composite charge 190. The uniform cooling of multi-ply prepreg composite charge 190 helps to mitigate thermal stresses in multi-ply prepreg composite charge 190 and prevent deformation. In some examples, the temperature of the chilled air, introduced into bladder 140, is gradually decreased to ensure gradual cooling.

Referring generally to FIGS. 1A and 1B and particularly to, e.g., FIG. 4E for illustrative purposes only and not by way of limitation, the following portion of this paragraph delineates example 29 of the subject matter, disclosed herein. According to example 29, which encompasses example 28, above, (block 572) flowing the chilled air into bladder 140 is performed using thermal module 182 and second thermal module 183.

Thermal module 182 and second thermal module 183 ensure that the temperature of the chilled air, introduced into bladder 140, is a set point (e.g., a gradually decreasing set point). For example, the air is heated as the air travels through bladder 140 while cooling the walls of bladder 140 and cooling multi-ply prepreg composite charge 190. As the air leaves first bladder volume 148, second thermal module 183 cools the air back to the set point before reintroducing the air into second bladder volume 149. Similarly, as the air leaves second bladder volume 149, thermal module 182 cools the air back to the set point before reintroducing the air into first bladder volume 148.

In some examples, each of thermal module 182 and second thermal module 183 is equipped with a chiller. Furthermore, in some examples, each of thermal module 182 and second thermal module 183 is equipped with a blower to recirculate the chilled air between first bladder volume 148 and second bladder volume 149 of bladder 140.

Referring generally to FIGS. 1A and 1B and particularly to, e.g., FIGS. 3A, 3B, 3C, and 3D for illustrative purposes only and not by way of limitation, the following portion of this paragraph delineates example 30 of the subject matter, disclosed herein. According to example 30, which encompasses any one of examples 1 to 29, above, method 500 further comprises, prior to (block 520) placing multi-ply prepreg composite charge 190 into chamber 100, (block 512) placing multi-ply prepreg composite charge 190 between porous separator films 160.

Porous separator films 160 prevent multi-ply prepreg composite charge 190 from sticking to other components while enables outgassing of multi-ply prepreg composite charge 190. Specifically, when the pressure inside chamber 100 is reduced below the atmospheric pressure, porous separator films 160 enables gasses to escape multi-ply prepreg composite charge 190. In some examples, one sheet of porous separator films 160 is positioned between multi-ply prepreg composite charge 190 and bladder 140. In one or more examples, another sheet of porous separator films 160 is positioned between multi-ply prepreg composite charge 190 and forming tool 130.

Referring generally to FIGS. 1A and 1B and particularly to, e.g., FIG. 4B for illustrative purposes only and not by way of limitation, the following portion of this paragraph delineates example 31 of the subject matter, disclosed herein. According to example 31, which encompasses any one of examples 1 to 25, above, method 500 also comprises, after curing multi-ply prepreg composite charge 190, (block 570) cooling multi-ply prepreg composite charge 190.

Cooling prepreg composite charge 190 ensures that multi-ply prepreg composite charge 190 preserves the second shape, e.g., after bladder 140 no longer supports multi-ply prepreg composite charge 190. In some examples, multi-ply prepreg composite charge 190 is cooled while multi-ply prepreg composite charge 190 is compressed between bladder 140 and forming tool 130. More specifically, multi-ply prepreg composite charge 190 remains configured by forming tool 130 to the second shape while being cooled.

Referring generally to FIGS. 1A and 1B and particularly to, e.g., FIGS. 4D and 4E for illustrative purposes only and not by way of limitation, the following portion of this paragraph delineates example 32 of the subject matter, disclosed herein. According to example 32, which encompasses example 31, above, (block 570) cooling multi-ply prepreg composite charge 190 comprises (block 572) flowing chilled air into bladder 140.

Flowing the chided air into bladder 140 ensures the uniform cooling of bladder 140 and, as a result, the uniform cooling of multi-ply prepreg composite charge 190, The uniform cooling of multi-ply prepreg composite charge 190 helps to mitigate thermal stresses in multi-ply prepreg composite charge 190 and prevent deformation. In some examples, the temperature of the chilled air, introduced into bladder 140, is gradually decreased to ensure gradual cooling.

Referring generally to FIGS. 1A and 1B and particularly to, e.g., FIG. 4E for illustrative purposes only and not by way of limitation, the following portion of this paragraph delineates example 33 of the subject matter, disclosed herein. According to example 33, which encompasses example 32, above, (block 572) flowing the chilled air into bladder 140 is performed using thermal module 182, fluidically coupled to bladder 140.

Thermal module 182 and second thermal module 183 ensure that the temperature of the chilled air, introduced into bladder 140, is a set point (e.g., a gradually decreasing set point). For example, the air is heated as the air travels through bladder 140 while cooling the walls of bladder 140 and cooling multi-ply prepreg composite charge 190. As the air leaves first bladder volume 148, second thermal module 183 cools the air back to the set point before reintroducing the air into second bladder volume 149. Similarly, as the air leaves second bladder volume 149, thermal module 182 cools the air back to the set point before reintroducing the air into first bladder volume 148.

In some examples, each of thermal module 182 and second thermal module 183 is equipped with a chiller. Furthermore, in some examples, each of thermal module 182 and second thermal module 183 is equipped with a blower to recirculate the chilled air between first bladder volume 148 and second bladder volume 149 of bladder 140.

Referring generally to FIGS. 1A and 1B and particularly to, e.g., FIGS. 8 and 9 for illustrative purposes only and not by way of limitation, the following portion of this paragraph delineates example 34 of the subject matter, disclosed herein. According to example 34, which encompasses any one of examples 1 to 33, above, chamber 100 is configured for forming composite part 195 from multi ply prepreg composite charge 190 using the steps of method 500.

Chamber 100 enables performing a specific operating sequence, which involves degassing multi-ply prepreg composite charge 190 prior to forming multi-ply prepreg composite charge 190. Specifically, the degassing is performed while at least a part of multi-ply prepreg composite charge 190 is exposed. At this stage, mufti-ply prepreg composite charge 190 is not yet compressed between bladder 140 and forming tool 130. Once multi-ply prepreg composite charge 190 is compressed between bladder 140 and forming tool 130, the degassing efficiency decreases as the gas path becomes blocked by bladder 140 and forming tool 130.

When the pressure inside chamber 100 is reduced below the atmospheric pressure, multi-ply prepreg composite charge 190 is exposed to the environment inside chamber 100, which causes degassing of multi-ply prepreg composite charge 190. It should be noted that multi-ply prepreg composite charge 190 is initially placed into chamber 100 while chamber 100 was at the atmosphere pressure. This degassing is performed for a period of time, which depends on various factors such as the thickness of multi-ply prepreg composite charge 190, the material properties of multi-ply prepreg composite charge 190 (e.g., porosity, density, elasticity), the required level of degassing, and the like. In some examples, the duration of degassing is between one minute and one hour or, more specifically, between five minutes and thirty minutes.

Figure 7:
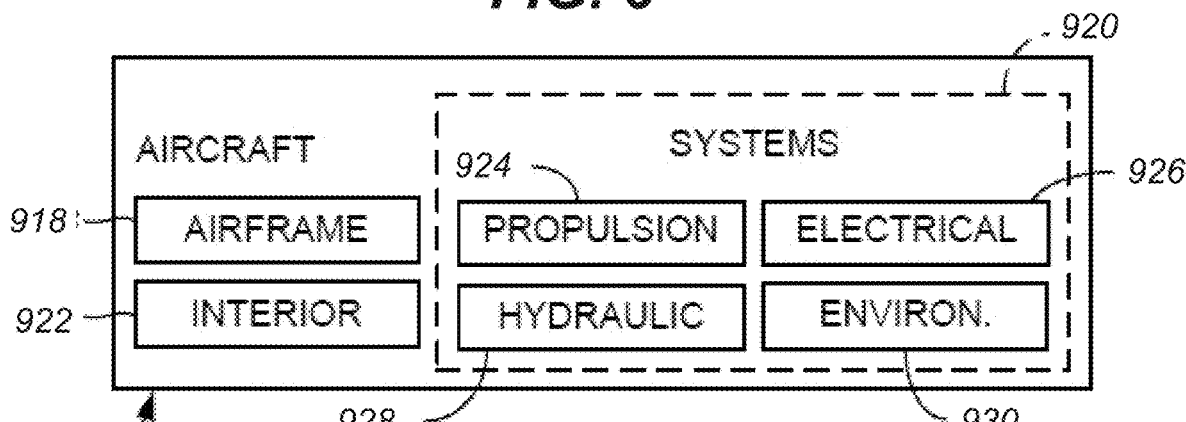
FIG. 7 is a schematic illustration of an aircraft.

Examples of the subject matter, disclosed herein may be described in the context of aircraft manufacturing and service method 900 as shown in FIG. 6 and aircraft 902 as shown in FIG. 7. During pre-production, method 900 may include specification and design (block 904) of aircraft 902 and material procurement (shown as block 906), During production, component and subassembly manufacturing (shown as block 908) and system integration (shown as block 910) of aircraft 902 may take place. Thereafter, aircraft 902 may go through certification and delivery (shown as block 912) to be placed in service (shown as block 914). While in service, aircraft 902 may be scheduled for routine maintenance and service (shown as block 916). Routine maintenance and service may include modification, reconfiguration, refurbishment, etc. of one or more systems of aircraft 902.

Each of the processes of method 900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, aircraft 902 produced by method 900 may include airframe 918 with a plurality of high-level systems 920 and interior 922. Examples of high-level systems 920 include one or more of propulsion system 924, electrical system 926, hydraulic system 928, and environmental system 930. Any number of other systems may be included. Although an aerospace example is shown, the principles disclosed herein may be applied to other industries, such as the automotive industry. Accordingly, in addition to aircraft 902, the principles disclosed herein may apply to other vehicles, e.g., land vehicles, marine vehicles, space vehicles, etc.

Apparatus(es) and method(s) shown or described herein may be employed during any one or more of the stages of method 900. For example, components or subassemblies corresponding to component and subassembly manufacturing (block 908) may be fabricated or manufactured in a manner similar to components or subassemblies produced while aircraft 902 is in service (block 914). Also, one or more examples of the apparatus(es), method(s), or combination thereof may be utilized during production stages, illustrated by block 908 and block 910, for example, by substantially expediting assembly of or reducing the cost of aircraft 902. Similarly, one or more examples of the apparatus or method realizations, or a combination thereof, may be utilized, for example and without limitation, while aircraft 902 is in service (block 914) and/or during maintenance and service (block 916).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

Although the foregoing concepts have been described in some detail for purposes of clarity of understanding, it will be apparent that certain changes and modifications can be practiced within the scope of the appended claims. It should be noted that there are alternative ways of implementing the processes, systems, and apparatus. Accordingly, the present examples are to be considered as illustrative and not restrictive.

What is claimed is:

1. A method of forming a composite part from a multi-ply prepreg composite charge, the method comprising steps of:
    reducing pressure inside a bladder, located in a chamber that is at atmospheric pressure, below the atmospheric pressure;
    placing the multi-ply prepreg composite charge, having a first shape, in the chamber;
    reducing pressure inside the chamber below the atmospheric pressure;
    while maintaining the pressure inside the chamber below the atmospheric pressure, expanding the bladder within the chamber by increasing the pressure inside the bladder to the atmospheric pressure, so that:
        the bladder comprises a first bladder volume and a second bladder volume;
        a forming tool is positioned between the first bladder volume and the second bladder volume;
        the multi-ply prepreg composite charge is compressed between the bladder and the forming tool; and
        the multi-ply prepreg composite charge is configured by the forming tool to a second shape, different from the first shape; and
    curing the multi-ply prepreg composite charge, having the second shape, by recirculating hot air between the first bladder volume and the second bladder volume to heat the multi-ply prepreg composite using the bladder.

2. The method according to claim 1, wherein, during the step of reducing the pressure inside the chamber below the atmospheric pressure, the multi-ply prepreg composite charge is separated from the forming tool by a gap.

3. The method according to claim 2, wherein:
    the chamber comprises a chamber housing and a chamber lid, coupled to the chamber housing and pivotable relative to the chamber housing;
    the step of reducing the pressure inside the chamber below the atmospheric pressure and the step of expanding the bladder within the chamber by increasing the pressure inside the bladder to the atmospheric pressure while maintaining the pressure inside the chamber below the atmospheric pressure each comprises providing a seal between the chamber lid and the chamber housing; and
    the forming tool is attached to and is supported by the chamber lid.

4. The method according to claim 1, further comprising a step of heating the mufti-ply prepreg composite charge before the step of expanding the bladder within the chamber.

5. The method according to claim 4, wherein the step of heating the mufti-ply prepreg composite charge before the step of expanding the bladder within the chamber is performed after the step of reducing the pressure inside the chamber below the atmospheric pressure.

6. The method according to claim 4, wherein the step of heating the multi-ply prepreg composite charge before the step of expanding the bladder within the chamber and the step of reducing the pressure inside the chamber below the atmospheric pressure are performed concurrently.

7. The method according to claim 4, wherein:
    the step of heating the multi-ply prepreg composite charge before the step of expanding the bladder within the chamber is performed using a heater; and
    the bladder is positioned between the heater and the multi-ply prepreg composite charge.

8. The method according to claim 4, wherein the step of heating the multi-ply prepreg composite charge before the step of expanding the bladder within the chamber is performed using a bladder surface heater, incorporated into the bladder.

9. The method according to claim 4, wherein the step of heating the multi-ply prepreg composite charge before the step of expanding the bladder within the chamber is performed using a blanket heater, positioned between the bladder and the multi-ply prepreg composite charge.

10. The method according to claim 9, wherein the step of curing the multi-ply prepreg composite charge comprises heating the multi-ply prepreg composite charge using the blanket heater, positioned between the multi-ply prepreg composite charge and the forming tool.

11. The method according to claim 1, wherein the step of expanding the bladder within the chamber comprises fluidically coupling the bladder to atmosphere.

12. The method according to claim 1, wherein the step of curing the multi-ply prepreg composite charge comprises heating the multi-ply prepreg composite charge using a forming-tool heater, incorporated into the forming tool.

13. The method according to claim 1, further comprising a step of heating the multi-ply prepreg composite charge using a bladder surface heater, incorporated into the bladder.

14. The method according to claim 1, further comprising a step of introducing the hot air into the bladder.

15. The method according to claim 1, wherein the step of recirculating the hot air between the first bladder volume and the second bladder volume is performed using a thermal module, fluidically coupled to the first bladder volume and the second bladder volume.

16. The method according to claim 1, wherein the first bladder volume is fluidically coupled to the second bladder volume via a duct, external to the bladder.

17. The method according to claim 1, wherein the first bladder volume is fluidically coupled to the second bladder volume via a passage, internal to the bladder.

18. A composite forming method comprising:
positioning a multi-ply prepreg composite charge having a first shape in a chamber between a bladder and a forming tool;
reducing a pressure inside the chamber below atmospheric pressure;
with the pressure inside the chamber below the atmospheric pressure, increasing a pressure inside the bladder to the atmospheric pressure to expand the bladder such that:
the bladder comprises a first bladder volume and a second bladder volume; and
the forming tool is positioned between the first bladder volume and the second bladder volume;
compressing the multi-ply prepreg composite charge between the bladder and the forming tool into a second shape that is different from the first shape; and
circulating hot air between the first bladder volume and the second bladder volume to heat the multi-ply prepreg composite using the bladder and to cure the multi-ply prepreg composite charge in the second shape.

19. The composite forming method of claim 18, further comprising reducing the pressure inside the bladder below the atmospheric pressure to separate the multi-ply prepreg composite charge from the forming tool by a gap before reducing the pressure inside the chamber below the atmospheric pressure.

20. The composite forming method of claim 18, further comprising recirculating the hot air between the first bladder volume and the second bladder volume using a thermal module that is fluidically coupled to the first bladder volume and the second bladder volume.

* * * * *